US008419451B2

(12) United States Patent
Kim

(10) Patent No.: US 8,419,451 B2
(45) Date of Patent: Apr. 16, 2013

(54) COVER FOR A CONNECTION TERMINAL OF A PORTABLE TERMINAL

(75) Inventor: Sang-Hyeon Kim, Gyeongsangbuk-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/326,867

(22) Filed: Dec. 15, 2011

(65) Prior Publication Data

US 2012/0164858 A1 Jun. 28, 2012

(30) Foreign Application Priority Data

Dec. 24, 2010 (KR) .................. 10-2010-0135034

(51) Int. Cl.
*H01R 13/447* (2006.01)
(52) U.S. Cl.
USPC ........................................ 439/136

(58) Field of Classification Search .............. 439/136, 439/137, 142, 148, 149
See application file for complete search history.

(56) References Cited

U.S. PATENT DOCUMENTS

| 5,738,536 | A * | 4/1998 | Ohgami et al. ............... 439/142 |
| 7,766,676 | B2 * | 8/2010 | Hsieh et al. .................... 439/136 |
| 2007/0293068 | A1 * | 12/2007 | Chang et al. .................. 439/137 |
| 2010/0221937 | A1 * | 9/2010 | Choi et al. .................... 439/142 |
| 2011/0157791 | A1 * | 6/2011 | Park et al. ................ 361/679.01 |
| 2012/0164858 | A1 * | 6/2012 | Kim .............................. 439/148 |

* cited by examiner

*Primary Examiner* — James Harvey
(74) *Attorney, Agent, or Firm* — Cha & Reiter, LLC

(57) ABSTRACT

A connection terminal opening and closing device for a portable terminal is provided, in which a connection terminal cover is disposed movably at an inlet of the connection terminal for automatically closing, when a predetermined area of the external cover is pressed which in turn triggers an elastic member engaged with the connection terminal cover between the body and the external cover to provide an automatic closing force to the connection terminal cover.

17 Claims, 6 Drawing Sheets

COVER FOR A CONNECTION TERMINAL OF A PORTABLE TERMINAL

CLAIM OF PRIORITY

This application claims priority under 35 U.S.C. §119(a) to a Korean Patent Application filed in the Korean Intellectual Property Office on Dec. 24, 2010 and assigned Serial No. 10-2010-0135034, the contents of which are incorporated herein by reference.

BACKGROUND OF THE INVENTION

1. Field of the Invention

The present invention relates to a portable terminal, and more particularly, to a cover for semi-automatically opening and closing a connection terminal that interface with an external device.

2. Description of the Related Art

In general, the term "portable terminal" covers a broad range of devices such as a cellular phone, a smart phone, a Personal Digital Assistant (PDA), a laptop, a tablet PC, a Web hard drive, a portable storage unit, and an auxiliary hard drive. In such a portable terminal, connection terminals are disposed at predetermined positions in a body and are electrically connected to external devices via universal connectors. The external devices may include a computer, a storage unit, and an auxiliary device such as an earphone, a headphone, a mouse, and a keyboard, etc.

A portable terminal typically includes a body having a data Input/Output (I/O) unit, a transmitter, and a receiver on its top surface, a battery pack on its bottom surface, and an earphone connection terminal as well as other connection terminals on its peripheral side surface. To protect these connection terminals from an external environment, covers are used.

A conventional connection terminal cover is so configured to simply slide to open or close. If a user inadvertently keeps the cover open, foreign materials can be introduced into the body or to the connection terminal.

Another known connection terminal cover comprises a rubber connection loop that a user pulls to open the cover. Similarly, when the user inadvertently leaves the cover open from a connection terminal and carries around, the rubber loop can be damaged or may lose the cover.

SUMMARY OF THE INVENTION

An aspect of embodiments of the present invention is to address at least the problems and/or disadvantages and to provide at least the advantages described below. Accordingly, an aspect of embodiments of the present invention is to provide an opening and closing device for a connection terminal of a portable terminal, in which when a user inadvertently leaves an exposed connection terminal cover open, the connection terminal cover can be closed in response to a slight impact externally or via a simple pressing thereof, thus minimizing any introduction of foreign materials into a body of the terminal.

In accordance with an embodiment of the present invention, a cover for a portable terminal having at least one connection terminal is exposed outward from a body and an external cover coupled to the body includes a connection terminal cover is disposed movably at an inlet of the connection terminal for automatically closing, when a predetermined area of the external cover is pressed, and an elastic member is engaged with the connection terminal cover between the body and the external cover for providing an automatic closing force to the connection terminal cover.

In accordance with another embodiment of the present invention, a cover for a connection terminal for a portable terminal, in which at least one connection terminal is exposed outward from a body, a connection terminal cover is disposed movably at an inlet of the connection terminal for automatically closing when a predetermined area of the body near the connection terminal is pressed, and an elastic member is engaged between the body and the connection terminal cover, for providing an automatic closing force to the connection terminal cover.

BRIEF DESCRIPTION OF THE DRAWINGS

The above features and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION

Reference will now be made in detail to the preferred embodiments of the present invention with reference to the accompanying drawings. For the purposes of clarity and simplicity, the following description is given only of components and/or operations required to understand the present invention and the other background art will not be described as it may make the subject matter of the present invention obscure.

Figure 1:
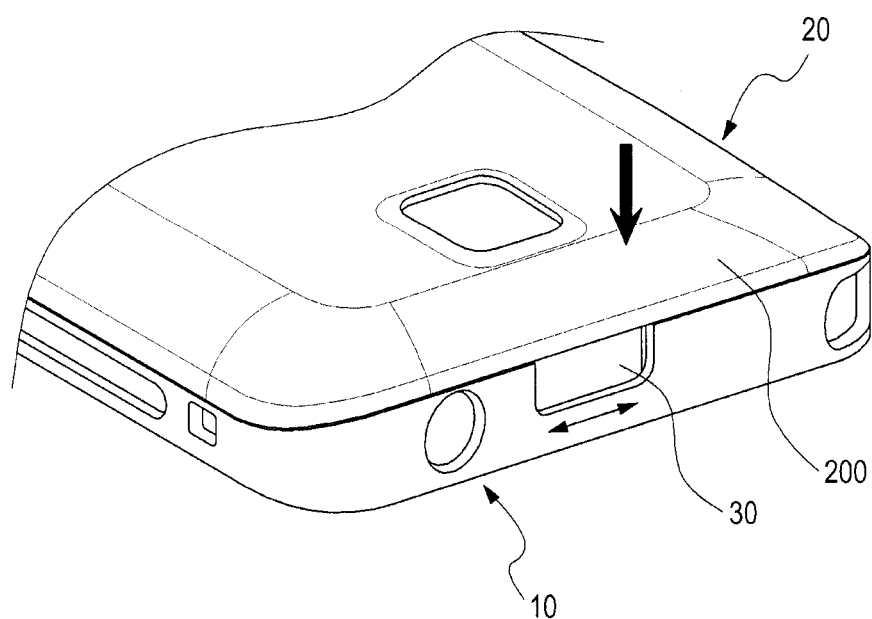
FIG. 1 is a bottom perspective view of a portable terminal having a connection terminal opening and closing device according to the present invention.

Referring to FIG. 1, according to the teachings of the present invention, when a user presses down a connection cover (hereinafter, shortly "an opening and closing device"), in an arrow direction, a connection terminal cover 30 automatically closes its opening to protect a terminal interface (covered by the connection terminal cover 30 and thus not shown) from being exposed to exterior. That is, if the user intentionally or inadvertently presses down a predetermined area of an external cover 20, which is detachable from a bottom surface of the body 10, the connection terminal cover 30 is automatically closed.

In alternate embodiment, the configuration of the opening and closing device may be modified in such a fashion that upon pressing of a predetermined area of the body 10, the connection terminal is automatically closed by the connection terminal cover 30. The predetermined area of the battery cover 20 is a planar surface near to the connection terminal cover 30 in a lower area of the battery cover 20. Although as the predetermined area is nearer to a later-described protrusion (21 in FIG. 8) of the battery cover 20, the protrusion can be pressed even with a slight impact on the lower area of the battery cover 20 in addition to the slight force applied in the arrowed direction. This is possible because the battery cover 20 is formed of hard synthetic resin.

In addition, while the opening and closing device is installed on a bottom surface of a lower part of the body 10, specifically a surface of a lower part of the external cover 20 since the interface terminal is typically disposed on a lower end surface of the body 10, if the connection terminal is disposed on a top surface or side surface of the body 10, the opening and closing device may also be positioned in those location. Thus, location of the inventive opening and closing device should not limit the scope of the invention.

The external cover 20 may be used as any cover provided on an outer surface of the body 10 in the present invention. For example, the external cover 20 may be a battery cover on the outer surface of the body 10, particularly a detachable battery cover on the bottom surface of the body 10.

Hereinbelow, the external cover 20 will be referred to as the battery cover 20 for illustrative purposes.

Figure 2:
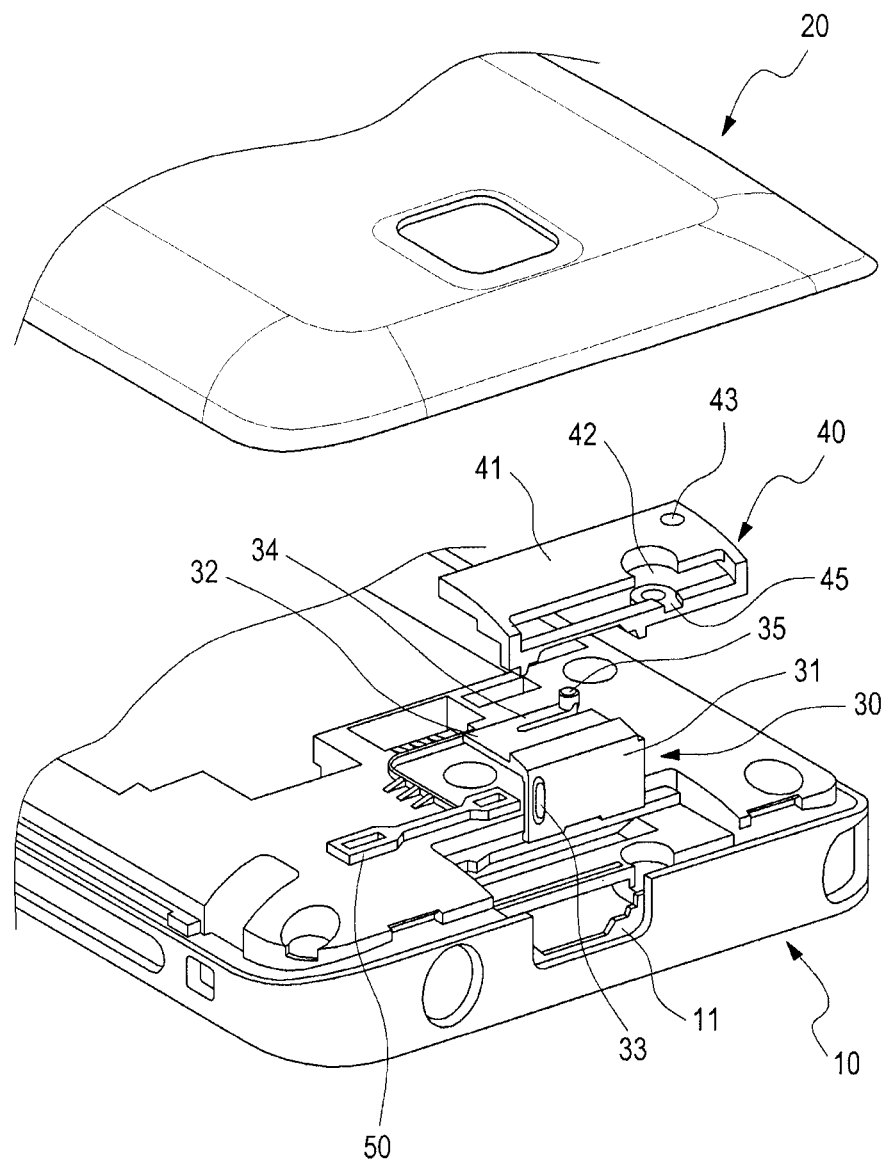
FIG. 2 is an exploded perspective view of the connection terminal opening and closing device according to the present invention.
Figure 3A:
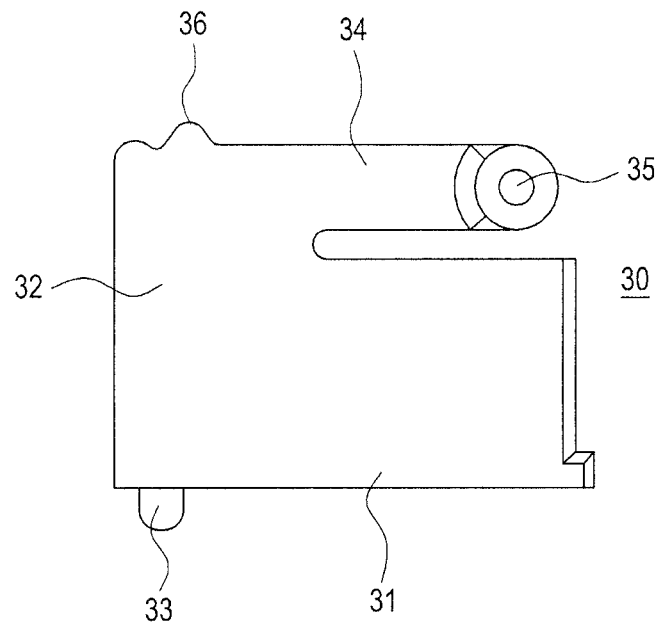
FIG. 3A is a plan view of a connection terminal cover used in the connection terminal opening and closing device according to the present invention.
Figure 3B:
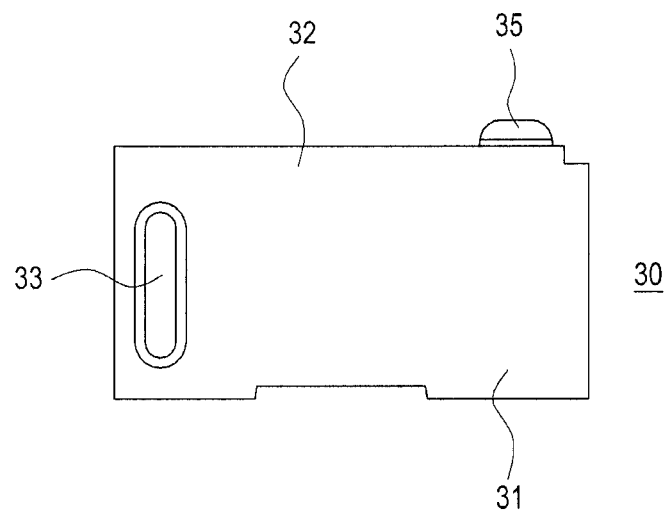
FIG. 3B is a front view of the connection terminal cover used in the connection terminal opening and closing device according to the present invention.
Figure 3C:
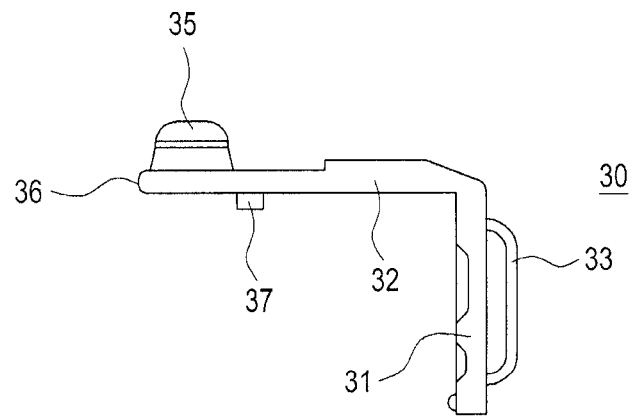
FIG. 3C is a side view of the connection terminal cover used in the connection terminal opening and closing device according to the present invention.

Referring to FIG. 2, the opening and closing device according to the present invention includes the connection terminal cover 30 and an elastic member 50. The connection terminal cover 30 is movably disposed at a connection terminal inlet 11, specifically on the lower end surface of the body 10 in such a fashion that when the predetermined area of the battery cover 20 is pressed, the connection terminal cover 30 automatically closes the connection terminal inlet 11.

The elastic member 50 is interposed between the body 10 and the battery cover 20, along a movement direction of the connection terminal cover 30 and then engaged with the connection terminal cover 30, for providing an automatic closing force to the connection terminal cover 30. In other words, both ends of the elastic member 50 are connected to the body 10 and the connection terminal cover 30. The elastic member 50 may be formed of high elastic rubber or silicon. When the connection terminal cover 30 is open at the connection terminal inlet 11, the elastic member 50 is kept connected to the body 10 and the connection terminal cover 30, thus maintaining an elastic force (a force pulling the connection terminal cover 30). Upon release of the connection terminal cover 30 from a locked state by pressing the predetermined area, the connection terminal cover 30 closes the connection terminal inlet 11 by the elastic member 50. A detailed connection structure of the elastic member 50 will be described later.

Referring to FIGS. 2, 3A, 3B and 3C, the connection terminal cover 30 is disposed at the connection terminal inlet 11. While the connection terminal inlet 11 may be positioned at any place of the body 10 where the connection terminal is provided, the connection terminal inlet 11 resides preferably on the lower end surface of the body 10 where an interface terminal is usually positioned. The connection terminal cover 30 includes a vertical extension portion 31, an opening and closing protrusion 33, a horizontal extension portion 32, a tension portion 34, a fixing protrusion 35, a sliding protrusion 36, and an engagement protrusion 37.

The vertical extension portion 31 is positioned at the connection terminal inlet 11 for opening or closing the connection terminal 11 depending on the movement direction by the connection terminal cover 30. The opening and closing protrusion 33 serving as a handle formed on an outer surface of the vertical extension portion 31 is exposed on the outer surface of the vertical extension portion 31. The horizontal extension portion 32 is integrally molded with the vertical extension portion 31 and bent into the dummy cover 40 at about 90 degrees from the vertical extension portion 31. The tension portion 34, the fixing protrusion 35, and the sliding protrusion 36 will be described later.

Figure 4:
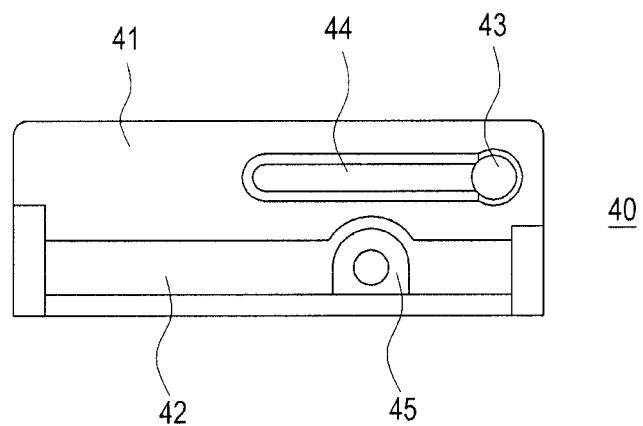
FIG. 4 is a bottom view of a dummy cover used in the connection terminal opening and closing device according to the present invention.

Referring to FIGS. 2 and 4, the dummy cover 40 is installed in the body 10 for interworking with the connection terminal cover 30. The dummy cover 40 includes a flat portion 41, a guide opening 42, a locking opening 43, and an engagement portion 45. The flat portion 41 is engaged with the body 10 by means of the engagement portion 45. The guide opening 42 is formed into the flat portion 41, so that the connection terminal cover 30 may move and glidably accommodated in the guide opening 42. The guide opening 42 is shaped in elongated form along a width direction of the body 10 to correspond with the movement of the connection terminal cover 30.

Figure 5:
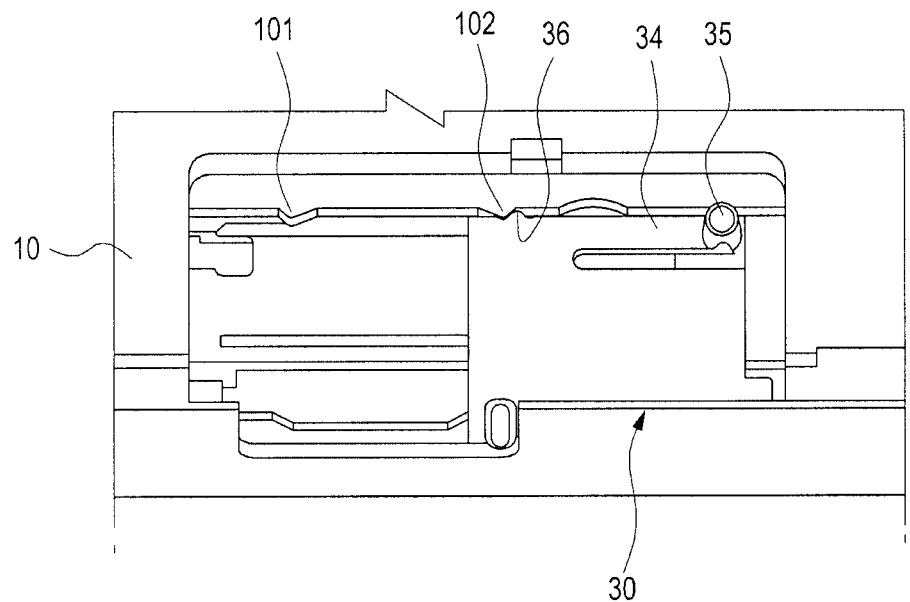
FIG. 5 is a perspective view of the connection terminal cover installed to a body according to the present invention.
Figure 6:
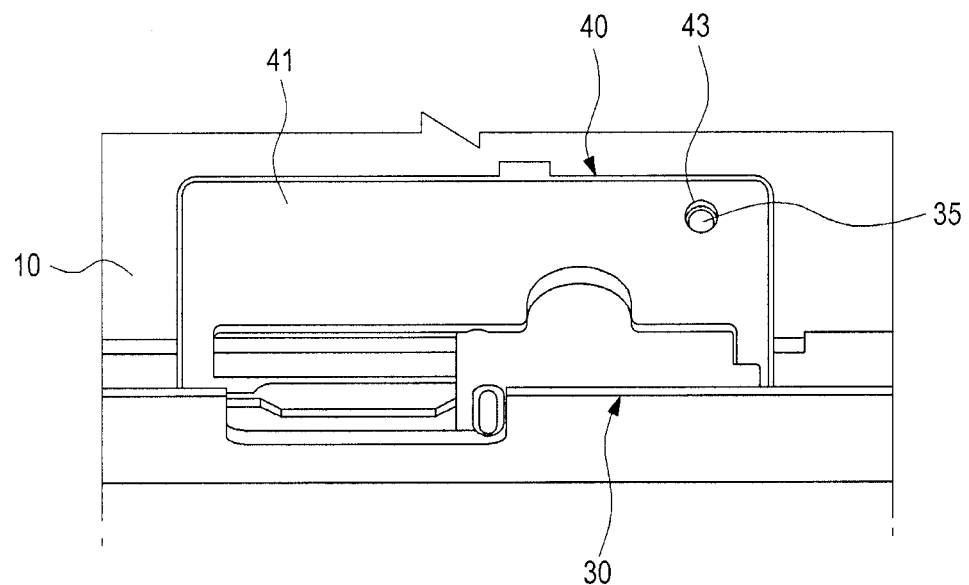
FIG. 6 is a perspective view of the connection terminal cover and the dummy cover which are installed to the body according to the present invention.

Referring to FIGS. 5 and 6, the opening and closing device includes a locker for locking and unlocking the connection terminal cover 30 and a positioner for maintaining the connection terminal cover 30 in an open or closed state.

The locker is responsible for maintaining the connection terminal cover 30 locked (opened) and unlocking the connection terminal cover 30 in responsive to a touch on the battery cover (20 in FIG. 1). The locker includes the locking opening 43 provided at a predetermined position of the flat portion 41, the cantilever-type tension portion 34 formed on the vertical extension portion, and the locking protrusion 35 protruding from an end portion of the tension portion 34 for locking or unlocking the connection terminal cover 30 depending on whether the locking protrusion 35 is inserted into the locking opening 43. The locking opening 43 is circular, and the locking protrusion 35 is semi-spherical so that the locking protrusion 35 may be actively inserted into or removed from the locking opening 43. A locking force between the locking protrusion 35 and the locking opening 43 is stronger than the elastic force of the elastic member (50 in FIG. 2). Therefore, when the locking protrusion 35 is completely engaged with the locking opening 43, the connection terminal cover 30 may be maintained open. On the other hand, when the locking protrusion 35 is gradually removed from the locking opening 43, the connection terminal cover 30 moves in a closing direction by the force of the elastic member.

The positioner serves to position the connection terminal cover 30 in the open or closed state and includes a sliding protrusion 36 protruding inward into the body 10 from the horizontal extension portion, and a pair of stoppers 101 and 102 provided in the body 10. The stoppers 101 and 102 serves to keep the connection terminal cover 30 closed and open, respectively. One stopper 101 is disposed at one side of the body 10, while the other stopper 102 is disposed at the other side of the body 10. The stoppers 101 and 102 protrude toward the connection terminal inlet. For making active sliding surface-contact with the locking protrusion 36, the stoppers 101 and 102 preferably protrude outward in the body 10 in the form of curved mountains. As the connection terminal cover 30 moves, the locking protrusion 36 makes a sliding surface-contact with the stoppers 101 and 102. The locker primarily places the connection terminal cover 30 in the closed and open states and the stoppers 101 and 102 secondarily keep the connection terminal cover 30 in the closed and open states, respectively.

Figure 7:
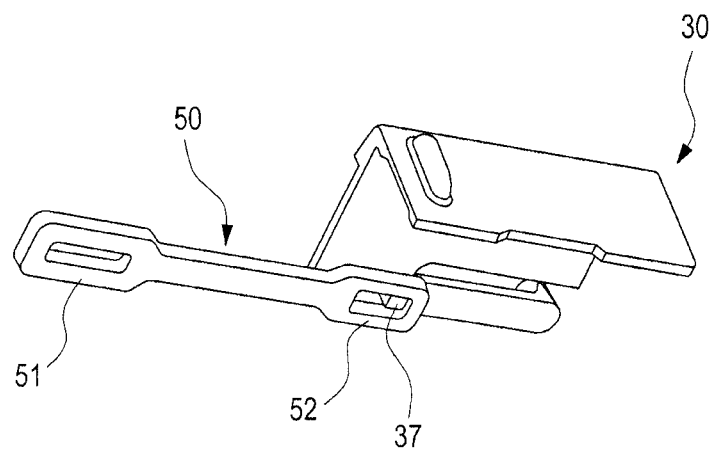
FIG. 7 is a bottom perspective view of an elastic member engaged with the connection terminal cover according to the present invention.

Referring to FIG. 7, the elastic member 50 is linearly elongated. One end 51 of the elastic member 50 is engaged with the fixing protrusion 37 of the connection terminal cover 30, and the other end 52 of the elastic member 50 is engaged with the body 10 of the terminal. When the connection terminal cover 30 opens the connection terminal inlet, the elastic member 50 is pulled with its maximum elastic force, providing an elastic force in a direction to close the connection terminal cover 30. That is, when the connection terminal cover 30 is opened, the elastic member 50 always provides a pulling force.

Figure 8:
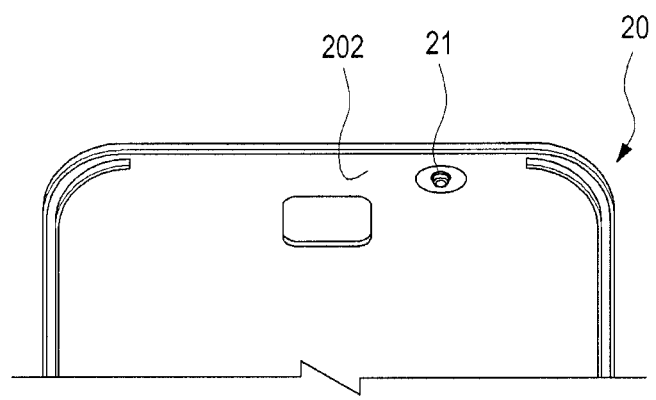
FIG. 8 is a perspective view of an inner surface of a predetermined area of a battery cover according to the present invention.

Referring to FIG. 8, the protrusion 21 vertically protrudes downward from an inner surface 202 of the predetermined area of the battery cover 20. When pressed, the protrusion 21 unlocks the connection terminal cover (30 in FIG. 1). To unlock the connection terminal cover, the user may press the protrusion 21 or around the protrusion 21 by slightly pushing down the cover 20 in the arrow direction shown in FIG. 1. Here, a protrusion 21 is in contact with a locking protrusion 35 and if the protrusion 21 is pressed, the locking protrusion 35 is also pressed. If the locking protrusion 35 is pressed, the locking protrusion 35 is removed from a locking opening 43 and is opened by an elastic member 50.

As is apparent from the above description of the present invention, since the connection terminal cover can be closed by experiencing a slight external impact or by a simple pressing, the portable terminal is convenient to use and introduction of foreign materials into the connection terminal or further into the body can be minimized. When a user inadvertently opens the connection terminal cover, the connection terminal cover can be automatically closed by the user's intentional or inadvertent pressing on the terminal.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. An opening and closing device for at least one connection terminal exposed outward from a body of a portable terminal, comprising:
   a connection terminal cover disposed movably at an inlet of the connection terminal for automatically closing when a predetermined area of the terminal is pressed; and
   an elastic member engaged with the connection terminal cover and the body for providing an automatic closing force to the connection terminal cover.

2. The device of claim 1, wherein the predetermined area is a planar surface near a lower area of the terminal.

3. The device of claim 1, further comprising a protrusion protruding from an inner surface of the predetermined area for releasing the connection terminal cover from a locked state when the predetermined area of the terminal is pressed.

4. The device of claim 1, further comprising a dummy cover provided in the body for interworking with the connection terminal cover.

5. The device of claim 4, wherein the connection terminal cover includes:
   a vertical extension portion positioned at the inlet of the connection terminal for opening or closing the inlet of the connection terminal according to the movement of the connection terminal;
   an opening and closing protrusion exposed on an outer surface of the vertical extension portion;
   a horizontal extension portion integrally formed with the vertical extension portion, bent into the dummy cover from the vertical extension portion; and
   a fixing protrusion on a bottom surface of the horizontal extension portion for being engaged with one end of the elastic member.

6. The device of claim 5, wherein the dummy cover includes:
   a flat portion engaged with the body in parallel; and
   a guide opening formed within the flat portion for accommodating the connection terminal cover so that the connection terminal cover is movable.

7. The device of claim 6, further comprising a locker between the dummy cover and the connection terminal cover for locking the connection terminal cover in an open state.

8. The device of claim 7, wherein the locker includes:
   a locking opening at a predetermined position of the flat portion;
   a cantilever-type tension portion on the vertical extension portion; and
   a locking protrusion protruding upward from an end portion of the tension portion for locking or unlocking the connection terminal cover depending on whether the locking protrusion is inserted into the locking opening.

9. The device of claim 6, further comprising a positioner between the body and the connection terminal cover.

10. The device of claim 9, wherein the positioner includes:
    a sliding protrusion protruding inward into the body from the horizontal extension portion; and
    a pair of stoppers protruding toward the inlet of the connection terminal in the body, facing the sliding protrusion, for maintaining the connection terminal cover in a closed and open state in conjunction with the sliding protrusion.

11. The device of claim 1, wherein the elastic member is formed of high elastic rubber or silicon, wherein one end engaged with the body and the other end engaged with the connection terminal cover.

12. The device of claim 1, wherein the predetermined area of the terminal corresponds to an area of a battery cover.

13. A terminal, comprising:
    a housing having a cover and a body;
    at least one connection terminal exposed outward from the body;
    a connection terminal cover disposed movably at an inlet of the connection terminal for automatically closing when a predetermined area of the body near the connection terminal is pressed; and
    an elastic member engaged between the body and the connection terminal cover for providing an automatic closing force to the connection terminal cover.

14. The terminal of claim 13, further comprising a dummy cover between the body and the connection terminal cover for interworking with sliding of the connection terminal cover.

15. The terminal of claim 14, further comprising a locker between the dummy cover and the connection terminal cover for locking the connection terminal cover in a closed state.

16. The terminal of claim 14, further comprising a positioner between the body and the connection terminal cover for helping to position the connection terminal cover in open and closed states.

17. The terminal of claim 13, wherein the predetermined area a planar surface near a lower area of the body.

* * * * *

UNITED STATES PATENT AND TRADEMARK OFFICE
CERTIFICATE OF CORRECTION

PATENT NO. : 8,419,451 B2
APPLICATION NO. : 13/326867
DATED : April 16, 2013
INVENTOR(S) : Sang-Hyeon Kim It is certified that error appears in the above-identified patent and that said Letters Patent is hereby corrected as shown below:

In the Claims:

Column 6, Claim 17, Lines 64-65 should read as follows:
--...predetermined area is planar...--

Signed and Sealed this
Twenty-first Day of May, 2013

Teresa Stanek Rea
*Acting Director of the United States Patent and Trademark Office*